Oct. 25, 1949.  A. J. BENT  2,485,805
FLUID PRESSURE CONTROLLED POSITIONING DEVICE
Filed April 30, 1947  2 Sheets-Sheet 2

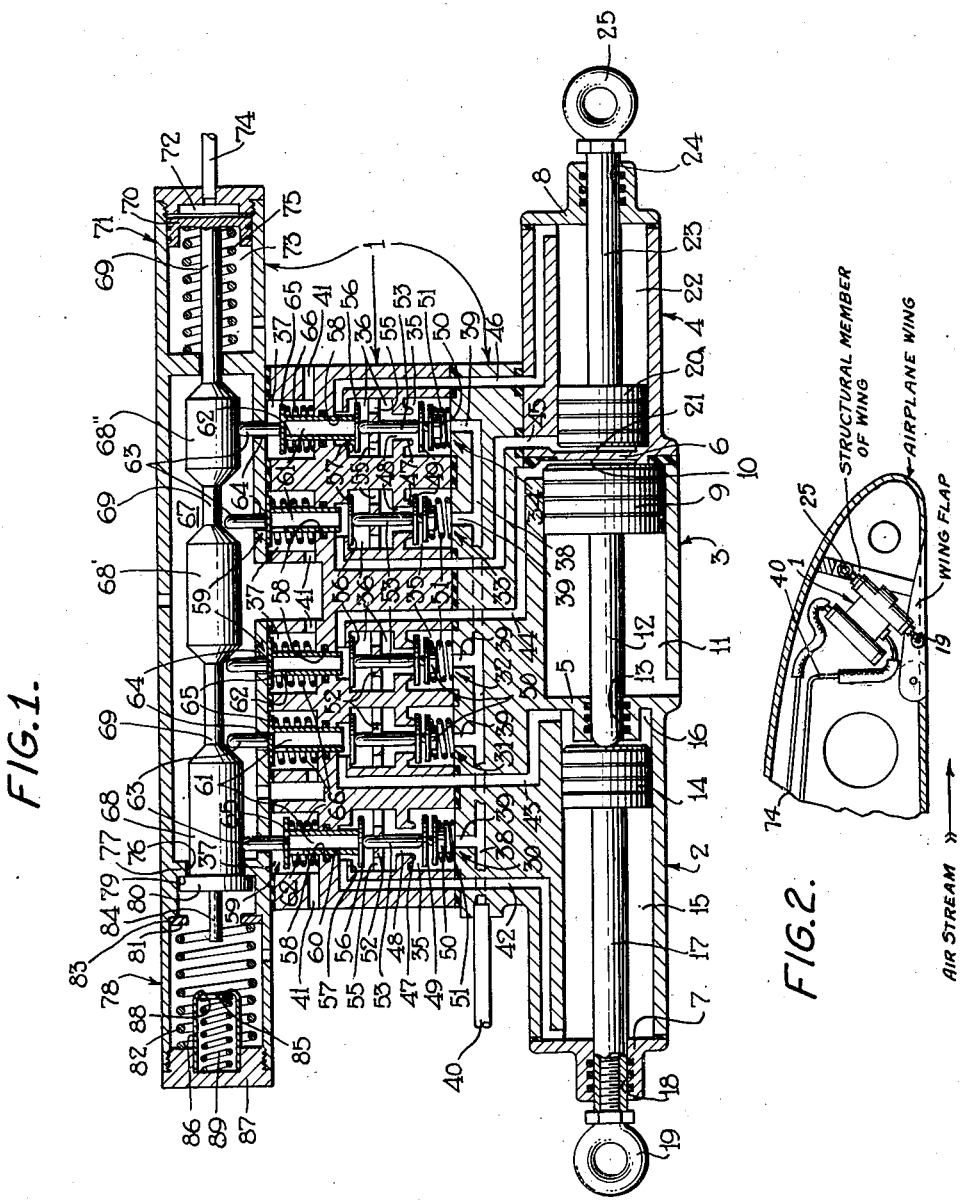

INVENTOR.
Arthur J. Bent
BY
Frank E. Miller
ATTORNEY

Patented Oct. 25, 1949

2,485,805

UNITED STATES PATENT OFFICE 2,485,805

FLUID PRESSURE CONTROLLED POSITIONING DEVICE

Arthur J. Bent, Penn Township, Allegheny County, Pa., assignor to The Westinghouse Air Brake Company, Wilmerding, Pa., a corporation of Pennsylvania Application April 30, 1947, Serial No. 745,075

3 Claims. (Cl. 121—38)

This invention relates to fluid pressure controlled mechanism and more particularly to apparatus particularly adapted for positioning airplane wing flaps.

One object of the invention is the provision of an improved apparatus of the above type.

The use of flaps and the like for increasing the lifting power of airplanes or for braking same is common practice, and experience has shown the need of means for automatically permitting retraction of these flaps to or toward their inoperative position when the air pressure exerted against them becomes excessive and threatens their destruction.

It is another object of this invention to provide improved means for positioning airplane wing flaps positively to a plurality of extended or operative positions and which will respond to excessive air pressure from the air stream of the plane exerted against said flaps to allow said flaps to automatically retract toward their inoperative position in degree proportional to the intensity of said pressure.

This object is accomplished in the present invention by providing a mechanism comprising an arrangement of multiple fluid pressure cylinders comprising pistons adapted to be positively moved to a plurality of relative extended positions and held in each of said positions by pressure of fluid acting on said pistons. The pistons are arranged to be operatively connected to wing and flap in such a manner that air pressure, incident to movement of the airplane, exerted against said flap exerts a thrust against said pistons which is opposed by the pressure of fluid in the cylinders. With the fluid acting on the pistons compressible, the pressure thereof may be overcome by an excessive thrust transmitted to said pistons from the extended flap so that said flap will automatically retract toward its inoperative position in proportion to the excessive increase in air pressure acting on said flap.

Other objects and advantages will become apparent from the following more detailed description of the invention.

Figure 3:
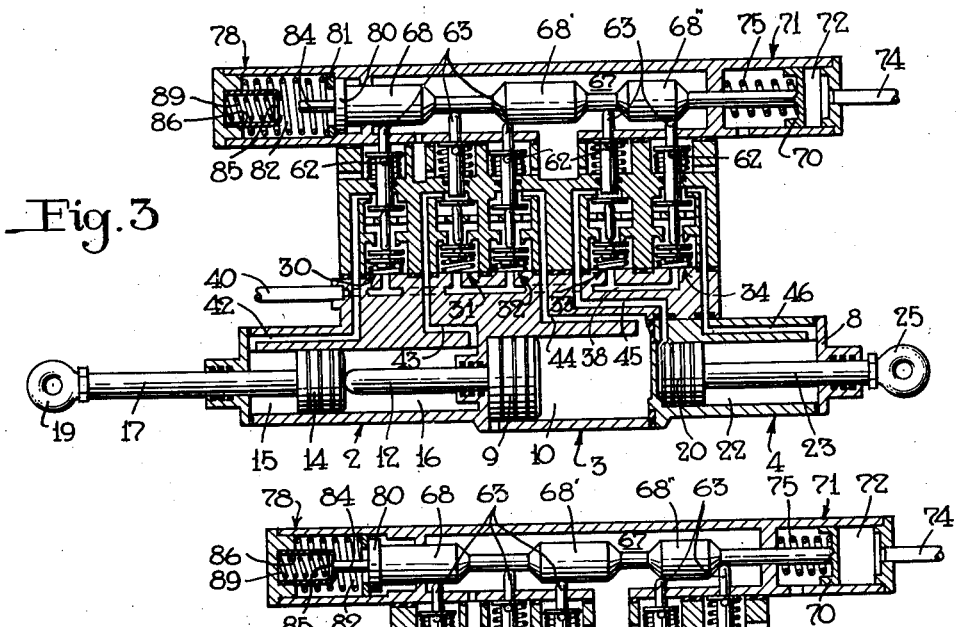
Figure 4:
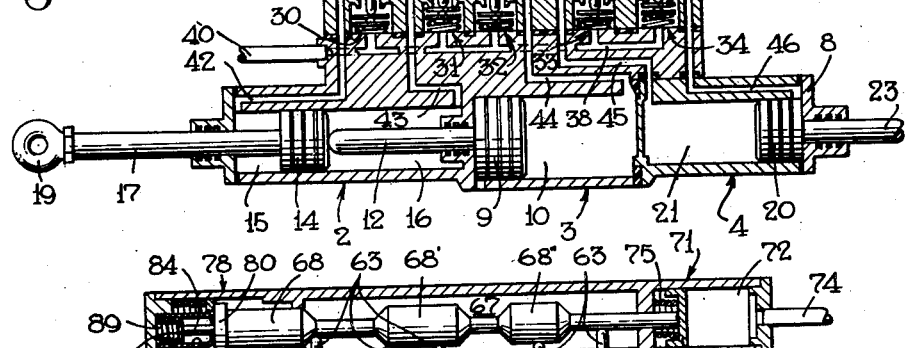
Figure 5:
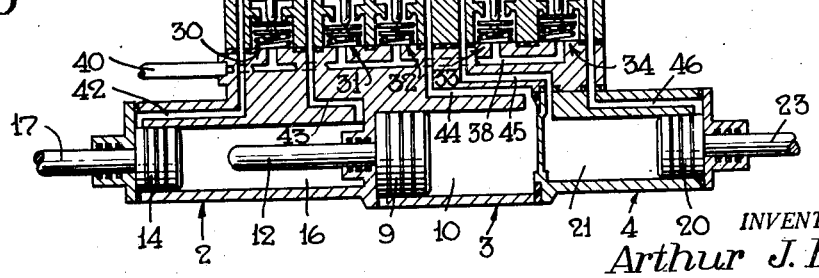

In the accompanying drawing, Fig. 1 is a diagrammatic view, mainly in section, of a fluid pressure controlled mechanism or apparatus embodying the invention; Fig. 2 is a part sectional view of a portion of an airplane wing embodying the apparatus; and Figs. 3, 4 and 5 are views of the apparatus, shown in Fig. 1, but in three other positions thereof.

According to the invention, the apparatus comprises a casing 1 having formed therein three co-axially aligned power cylinders 2, 3, and 4. Cylinders 2 and 4 are of equal diameter while cylinder 3 is of larger diameter than cylinder 2. Walls 5 and 6 are formed in the casing which act as partitions between cylinders 2 and 3 and cylinders 3 and 4, respectively. A removable end wall 7 closes the outer end of cylinder 2, and a similar end wall 8 closes the outer end of cylinder 4.

A power piston 9 is operatively disposed in cylinder 3 dividing said cylinder into a pressure chamber 10 adjacent to wall 6, and an atmospheric chamber 11 adjacent to wall 5. A piston rod 12 is attached to piston 9 and projects centrally therefrom through chamber 11 and a bore 13 in wall 5 for engagement with a power piston 14 of smaller diameter than piston 9 and operatively disposed in cylinder 2. Piston 14 divides cylinder 2 into pressure chambers 15 and 16 which are adjacent to end wall 7 and wall 5, respectively. A piston rod 17 attached to piston 14 extends centrally therefrom through chamber 15 and out through a central bore 18 in end wall 7 and an eye bolt 19 is adjustably secured to the outer end of said rod. The cylinder 2 is longer than the cylinder 3 so that travel of piston 14 will be greater than the travel of piston 9.

A power piston 20, of equal diameter to piston 14, is operatively disposed in cylinder 4, dividing the interior thereof into pressure chambers 21 and 22. A piston rod 23 is attached to piston 20 and projects centrally therefrom into chamber 22 and through a central bore 24 in end wall 8 and an eye bolt 25 is adjustably secured to the outer projecting end of said rod.

A plurality of valve assemblies 30, 31, 32, 33 and 34 are provided for controlling operation of the power pistons 9, 14, and 20. Each of the valve assemblies above enumerated is provided with an inlet chamber 35, a control chamber 36, and an exhaust chamber 37 which are formed in casing 1 in coaxial alignment. Each of the inlet chambers 35 is open by way of a casing passage 38 and a branch passage 39 to a fluid pressure supply pipe 40 which is normally adapted to be supplied with fluid under pressure from any suitable source. Each of the exhaust chambers 37 opens to atmosphere by way of an exhaust passage 41. A casing passage 42 connects the control chamber 36 of valve assembly 30 with the pressure chamber 15 of cylinder 2 at the outer end thereof. Similar casing passages 43, 44, 45 and 46 connect the control chambers 36 of valve assemblies 31, 32, 33, and 34, respectively, with pressure chambers 16, 10, 21 and 22 of cylinders 2, 3 and 4. An annular valve seat rib 47 is formed in the casing encircling an opening 48 connecting chambers 35 and 36 in each valve assembly. A supply valve 49 is disposed in each chamber 35 for cooperation with seat rib 47 for controlling communication through the opening 48. A member 50, also disposed in each chamber 35, is subject to pressure of a compression spring 51 which forces said member 50 into point contact with valve 49 for urging said valve toward its seat rib 47. The valves 49 and members 50 are of such dimensions with respect to the peripheral dimensions of chambers 35 that fluid under pressure is free to flow thereby when said valves are unseated. A guide member 52 is formed in the casing in each chamber 36 for accommodating a rod 53 slidably disposed in a central bore through member 52 coaxially with said chamber. The members 52 divide the chambers 36 into two parts which however are connected by openings 55 through said members. Each rod 53 is arranged to contact at its one end the respective supply valve 49 and at its opposite end a disk-shaped release valve 56 in the respective chamber 36 opposite to an annular casing shoulder 57 formed at the upper end of said chamber, as viewed in the drawing. A central bore 58 connects the lower end of each exhaust chamber 37 with the upper end of each control chamber 36. A valve actuating member 59 is operatively disposed in each of the exhaust chambers 37 which member 59 comprises a hollow rod portion 60 which projects through the respective bore 58 into the upper end of respective chamber 36 for seating against the respective release valve 56. A central opening 61 extends through each portion 60 from the lower end thereof to ports 62 which open into the exhaust chamber 37. A cam follower 63 in the form of a pin is attached to the upper end of each rod portion 60 and projects outwardly therefrom through an opening 64 in the upper ends of the respective chamber 37, the several followers 63 being arranged in line and in parallel spaced apart relation. A flange 65 is formed in each member 59 at the junction of the follower 63 and the portion 60 for accommodating one end of a compression spring 66 disposed in the chamber 37 for urging said member 59 upward, a distance limited by contact between its flange 65 and the portion of the casing forming one end of chamber 37.

Each of the valve assemblies 30 to 34 inclusive has a fluid pressure supply position in which position the assemblies 30 and 34 are shown in the drawing, and a fluid pressure release position in which position the assemblies 31, 32 and 33 are shown in the drawing. The parts of each assembly assume the fluid pressure supply position upon depression of follower 63 and attached sleeve 60 against spring 66 to seat said sleeve against the release valve 56, for closing the opening 61 and thereby communication between chambers 36 and 37, and to displace said valve 56 and rod 53 to unseat the supply valve 49 against opposition of spring 51 for opening the inlet chamber 35 to control chamber 36 and thence to a respective passage 42, 43, 44, 45 or 46. The release position of any of the valve assemblies is assumed when the portion 60 of member 59 is disposed away from the release valve 56 urged thereto by action of spring 66 for opening control chamber 36 and thereby connected passages 42, 43, 44, 45 or 46, as the case may be, to exhaust chamber 37 by way of passage 61 in said portion 60, and the spring 51 is thereby rendered effective to seat the supply valve 49, closing the supply chamber 35 from the control chamber 36.

A cam assembly 67, extending over the projecting ends of followers 63 comprises a plurality of substantially cylindrical cam members 68, 68', and 68" encircling a central shaft 69 to which they are attached coaxially and spaced apart at desired intervals longitudinally therealong. The ends of cylindrical cam members 68, 68', 68" are tapered or curved into the shaft 69 for slidable engagement with the ends of followers 63 for displacing same upon longitudinal movement of the cam assembly, as will hereinafter be described. A control piston 70 is attached to one end of shaft 69 to effect such movement in one direction. The piston 70 is operatively disposed in a control cylinder 71, dividing said cylinder into a pressure chamber 72, and an atmospheric chamber 73 through which the shaft 69 extends. A control pipe 74 is connected to the pressure chamber 72 for conveying fluid under pressure thereto, and a compression spring 75 is suitably disposed in chamber 73 for urging the piston 70 in the direction of chamber 72.

The opposite end of cam assembly 67 is slidably supported in a bore 76 opening through an end wall 77 of a spring stop cylinder 78 which is open to the atmosphere. On the side of wall 77 opposite the cylinder 71 the shaft 69 is provided with a flange 80 one side of which is arranged to contact a surface 79 on said wall 77 for limiting movement of said shaft, the several cam members and the piston 70 in the direction of the right hand by action to spring 75. The opposite side of flange 80 is arranged to engage an annular stop member 81 which is slidably disposed in the cylinder 78 and urged by a compression spring 82 to seat against an annular casing shoulder 83 spaced a desired distance away from the wall surface 79. A centrally projecting stop rod 84 extends from the end of cam assembly 67 for engagement with a disk-shaped stop member 85 normally disposed a certain distance away from shoulder 83. The stop member 85 is slidably disposed within a central guide sleeve member 86, one end of which is removably secured to a removable end wall 87 of cylinder 78, while the opposite end of said sleeve member 86 forms an annular shoulder 88 against which said member 85 is urged to a normal position by a compression spring 89.

Engagement of one or another of the cams 68, 68', 68" with one or another of the followers 63 of the valve assemblies is adapted to actuate the respective assembly to its fluid pressure supply position, while, when disengaged, the valve assembly is adapted to assume its fluid pressure release position, as will hereinafter be described in detail.

Eye bolts 19, 25 may be pivotally connected to two elements, respectively, adapted to be positioned one relative to the other, such as to a structural member of an airplane wing, and to an airplane wing flap, for example, as shown in Fig. 2. The entire mechanism is supported by the elements to which the eye bolts 19, 25 are pivotally connected, the casing 1 therefore is not fixed and the relative distance between said eye bolts determines the position of one element relative to the other. If an airplane wing is one element and an airplane wing flap the other, the wing flap may be assumed to be pivotally connected, as shown in Fig. 2, at its one end to said wing whereby the distance between the eye bolts 19, 25 will determine the angular position of said wing flap relative to said wing. It matters not which of the eye bolts 19, 25 is connected to the wing or which is connected to the flap.

Operation

In operation, let it be initially assumed that pipe 40 and thereby chambers 35 are supplied with fluid under pressure and that chamber 72 of control cylinder 71 is void of fluid under pressure, as a result of which, due to action of spring 75 the piston 70 and attached cam assembly 67 will be in their extreme right hand position defined by contact between the flange 80 and casing surface 79 and which may be considered to be a first stop position of said assembly. The cam members 68, 68', 68'' will thereby be so positioned as to displace the followers 63 of valve assemblies 30 and 34 so that said assemblies will be in their supply positions, while the remaining valve assemblies 31, 32, and 33 will be in their release positions. With the valve assembly 30 in supply position, fluid under pressure will flow to the pressure chamber 15 of power cylinder 2 by way of the respective casing passage 42, while with the valve assembly 31 in release position the chamber 16 of cylinder 2 is open to atmosphere by way of casing passage 43. The pressure chamber 10 of power cylinder 3 is similarly open to the atmosphere by way of casing passage 44 and the valve assembly 32 which is also in release position. Likewise, pressure chamber 21 of power cylinder 4 is similarly open to atmosphere by way of casing passage 45 and the valve assembly 33 in release position, while the pressure chamber 22 of cylinder 4 is supplied with fluid under pressure through passage 46 by the valve assembly 34 which is in supply position. Since chamber 16 of cylinder 2 and chamber 10 of cylinder 3 are both open to the atmosphere as above described, the pressure of fluid in the chamber 15 of cylinder 2 acting on one face of piston 14 will urge said piston and the piston 9 to their extreme right-hand limit of travel, as viewed in the drawing. Similarly, pressure of fluid in chamber 22 of cylinder 4, in absence of fluid under pressure in chamber 21 of said cylinder, will urge piston 20 against end wall 6. The distance between eye bolts 19 and 25 is now at a minimum, and if said bolts be considered to be connected to a fixed wing structure and to a wing flap member, as previously assumed, the apparatus will now be conditioned to maintain the wing flap in a retracted position in which it is shown in Fig. 2.

Now assume that it is desirable to lower or extend the flap on the airplane wing a certain fraction of its total travel according to the degree of increase of lift and drag desired for reasons of airplane operation as in landing or taking off under different loads and different weather conditions. Fluid at a certain pressure is supplied by way of control pipe 74 to the pressure chamber 72 of cylinder 71 from a suitable control device (not shown). This pressure of fluid in chamber 72 acts on piston 70 to overcome the spring 75 and move the cam assembly 67 in the direction of stop cylinder 78 to a second stop position defined by contact of the flange 80 with the annular stop member 81, in which it is shown in Fig. 3, which stops said piston and cam assembly due to the force of spring 82 acting on said stop member. The cam assembly will then remain in this position until the pressure of fluid in chamber 72 of control cylinder 71 is increased sufficiently to overcome the action of spring 82 or reduced sufficiently to allow spring 75 to become effective to return it to the original position.

During movement of the cam assembly 67 to the above mentioned second stop position, the cam members 68, 68', 68'' of said assembly are thereby each moved the equivalent distance to a position, in which they are shown in Fig. 3, whereby the follower 63 of valve assembly 30 remains in contact with cam 68 to maintain said assembly in its supply position. No cam member is yet in position to displace follower 63 of valve assembly 31, so that said assembly is yet in its release position. The cam 68' has been moved into contact with and displaced follower 63 of valve assembly 32 so that said valve assembly is in its supply position. Follower 63 of valve assembly 33 remains out of contact with any cam member, and cam member 68'' remains in contact with follower 63 of valve assembly 34 so that both assemblies 33 and 34 yet remain in their release and supply positions, respectively.

Since in movement of cam assembly 67 to this second stop position only the position of valve assembly 32 has been changed, from its release to its supply position, only the status of pressure chamber 10 of power cylinder 3 is affected. The chamber 10 is now supplied with fluid under pressure from supply passage 38 by the valve assembly 32 in its supply position and through the casing passage 44. Pressure of fluid is still effective in chamber 15 on piston 14 to hold said piston in contact with rod 12 of piston 9, but since said piston 9 is of greater area than piston 14, the fluid at the same pressure in chamber 10 acting on piston 9 creates a differential in forces which moves piston 9 from its position as shown in the drawing in Fig. 1 to its extreme left-hand position, in which it is shown in Fig. 3, carrying the piston 14 an equivalent distance in the direction of chamber 15. The rod 17 attached to piston 14 and eye bolt 19 secured thereto is thereby moved to a position further extended from the casing 1, and the distance between said eye bolt 19 and the opposite eye bolt 25 secured to piston rod 23, which latter eye bolt yet remains positioned relative to the casing as shown, is increased, thereby positioning the airplane wing flap, pivotally connected to said eye bolt 19, to a proportionate extended position and maintaining it in said position in opposition to pressure of air exerted thereagainst as said flap moves through an air stream.

Should it be desired to further extend the wing flap, pressure of fluid in pressure chamber 72 of control cylinder 71 is increased via control pipe 74 sufficiently to cause a force to act on piston 70 which will move the cam assembly 67 further in the direction of stop cylinder 78 against opposition of both springs 75 and 82 to a third stop position in which it is shown in Fig. 4, defined by contact of rod 84 with the stop member 85, the force of spring 89 on said member preventing further movement thereof.

During movement of cam assembly 67 from its second to its third stop position, only the position of followers 63 of valve assemblies 33 and 34 are changed, the positions of followers 63 of valve assemblies 30, 31 and 32 which control operation of power cylinders 2 and 3 remain as described in the second stop position of said assembly 67. In this third position, the cam 68'' is now displacing follower 63 of valve assembly 33 and has moved out of contact with the follower 63 of valve assembly 34 so that the assemblies 33 and 34 are now in supply position and release position, respectively. With the valve assembly 34 in release position fluid under pressure in chamber 22 of power cylinder 4 is vented to the atmosphere by way of casing passage 46, while with the valve assembly 33 in supply position fluid under pressure is supplied to chamber 21 of cylinder 4 by way of the casing passage 45. A differential in pressures of fluid between chambers 21 and 22 in cylinder 4 across piston 20 is thus created which moves said piston and thereby the rod 23 and eye bolt 22 (not shown in Fig. 4) to an extreme position in which said piston is seated against the end wall 8. The distance between eye bolts 19 and 25 is now further increased so that the airplane wing flap connected to eye bolt 19 as previously described will now be further extended outwardly of the wing.

Now assume that it is desired to effect movement of the wing flap to a fully extended angular position relative to the surface of the wing, by increasing the pressure of fluid in the pressure chamber 72 of control cylinder 71 sufficiently to overcome action of springs 75, 82 and 89 acting on piston 70, flange 80, and rod 84, respectively, the piston 70 and cam assembly 67 are moved further in the direction of stop cylinder 78 to a fourth stop position, in which they are shown in Fig. 5, defined by contact between the end face of flange 80 and the outer end of guide sleeve member 86 into which the central rod 84 of cam assembly 67 now projects. In moving the cam assembly 67 from third stop position to its fourth stop position, cam member 68' remains in contact with follower 63 of valve assembly 32, the cam member 68" remains in contact with the follower 63 of valve assembly 33, and the follower 63 of valve assembly 34 remains out of contact with any cam member. The positions of valve assemblies 32, and 33 and 34 are therefore the same in the fourth stop position of cam assembly 67 as in the third stop position, thereof, i. e. supply and release positions, respectively. Conditions in chambers 10, 21 and 22 of power cylinders 3 and 4, as influenced by the positions of valve assemblies 32, and 33 and 34, therefore remain unchanged and the positions of power pistons 9 and 20 and attached rods 12 and 23 determined by said conditions also are not changed. In the fourth stop position of cam assembly 67, in which it is shown in Fig. 5, however, the valve assemblies 30 and 31 are in, respectively, release position and supply position, due to movement of cam member 68 away from follower 63 of assembly 30 and simultaneous movement of cam 68' into displacement contact with the similar follower 63 of valve assembly 31.

Fluid under pressure is therefore now vented from chamber 15 of power cylinder 2 and supplied to chamber 16 thereof by way of casing passages 42 and 43, and the valve assemblies 30 and 31. The power piston 14 is now moved away from the projecting end of piston rod 12 to an extreme position seated against end wall 7 by a force created by the now existent differential in pressures acting on its opposite faces, so that the piston rod 17 and attached eye bolt 19 (not shown in Fig. 5) are moved outwardly to a maximum extended position. The distance between extreme positions of eye bolts 19 and 25 is now at a maximum and the wing flap will be now at its maximum extended angular position relative to the wing.

Now if it is desired to return the wing flap from its maximum extended position, in which it is shown in Figs. 1 and 2, to its fully retracted position or to an intermediate position therebetween, fluid under pressure is released from the pressure chamber 72 of control cylinder 71 so that springs 89, 82 and 75 become effective to return the cam assembly to any one of its previous stop positions, dependent upon the pressure to which said fluid is reduced. Since the effect on the fluid pressure controlled apparatus of reducing the pressure of fluid in chamber 72 of control cylinder 71 is just the reverse of the effect of increasing said pressure, it will be appreciated that the piston rods 17 and 23 will retract into cylinders 2 and 4 in successive steps in exact reverse of previously described extension thereof.

Now assume that in any of the previously described relative positions of pistons 14, 9, and 20, the pressure medium is a compressible fluid which is acting on said pistons to maintain them so positioned against opposing thrust acting on eye bolts 19 and 25, as would be the case when said bolts are connected to wing and extended flap moving in an air stream since the air exerts a pressure against said flap. The pressure of compressible fluid can be so adjusted that the force it exerts on pistons 14, 9, and 20, in any one of their relative positions, is sufficient to maintain the flap extended into the air stream under normal conditions of operation but insufficient to maintain said flap so extended should the pressure of air exerted against the flap become dangerously excessive. Under these conditions the compressible fluid acting on the above named pistons would act as a spring and allow the flap to move out of the air stream a distance sufficient to reduce the force of air acting thereon to a desired safe degree and thereby prevent destruction of the flap. As soon as the abnormal condition of excessive air pressure subsides, the spring action of the compressible fluid will actuate the piston or the pistons to automatically return the flap to its former extended position.

*Summary*

It will now be seen that I have provided a relatively simple mechanism particularly adapted for positioning an airplane wing flap and the mechanism being controlled by compressible fluid is yieldable to permit automatic adjustment of the flap for limiting to a safe degree the force thereon from the air stream.

Having now described my invention, what I claim as new and desire to secure by Letters Patent, is:

1. A four position fluid pressure controlled apparatus comprising in combination with a source of fluid under pressure, a first cylinder, a second cylinder of greater diameter than said first cylinder arranged coaxially therewith and separated therefrom by a first partition, a third cylinder of diameter equal to that of said first cylinder arranged in alignment with said second cylinder and separated therefrom by a second partition, first piston means slidably disposed in said first cylinder dividing it into a first fluid pressure chamber and a second fluid pressure chamber adjacent to said partition, a first adjusting rod secured to said first piston means for movement therewith and extending therefrom through said first fluid pressure chamber, second piston means of greater area slidably disposed in said second cylinder dividing it into a third fluid pressure chamber and an atmospheric chamber adjacent to said first partition, rigid means secured to said second piston means extending through said first partition for cooperation with said first piston means, means for limiting travel of said second piston means to a distance less than that of said first piston means, third piston means of area equal to that of said first piston means slidably disposed in said third cylinder dividing it into a fourth fluid pressure chamber and a fifth fluid pressure chamber adjacent to said second partition, a second adjusting rod secured to said third piston means for movement therewith and extending therefrom through said third fluid pressure chamber, and valve means operative to one position to open said first fluid pressure chamber and said fourth fluid pressure chamber to said source and to open the second, third and fifth chambers to atmosphere, operative to another position to close the third fluid pressure chamber to atmosphere and open it to said source, to another position to close the fourth fluid pressure chamber from said source and open it to atmosphere and at the same time close the fifth fluid pressure chamber to atmosphere and open it to said source, and to still another position to close said first fluid pressure chamber to said source and open it to atmosphere and at the same time close said second fluid pressure chamber to atmosphere and open it to said source.

2. The combination as set forth in claim 1 including cam means for operating said valve means, fluid pressure means for actuating said cam means, and resilient means for defining a plurality of stop positions for said cam means.

3. A fluid pressure apparatus for varying in chosen increments the distance between two elements to be adjusted comprising first and second pistons connected to said elements and a third piston interposed between said first and second pistons in coaxial relationship therewith, said third piston being of greater area than said first piston, means for limiting the stroke of said third piston to a degree less than the stroke of said first piston, means for connecting said first piston to said third piston for movement thereby, said first piston being subject on its outer face to pressure of fluid in a first chamber and on its opposite face to pressure of fluid in a second chamber, said third piston being subject on the face adjacent said first piston to atmospheric pressure and on the opposite face to pressure of fluid in a third chamber, and said second piston being subject on the face adjacent said third piston to pressure of fluid in a fourth chamber and on the opposite face to pressure of fluid in a fifth chamber, a plurality of valve means, one for each of said chambers, and each comprising a depressible element operable upon depression for effecting operation of the valve means to supply fluid under pressure to the respective chamber and operable upon relief for effecting operation of the valve means to release fluid under pressure from the respective chamber, a longitudinally movable cam rod extending over the depressible elements of said valve means, cam means associated with said rod operable in a normal position of said rod to effect operation of said valve means to supply fluid under pressure to said first and fifth chambers and to open the other of said chambers to atmosphere, said cam means being operable in a second position of said rod to effect operation of said valve means to supply fluid under pressure to said first, third and fifth chambers and to vent said second and fourth chambers, and in a third position of said rod to supply fluid under pressure to said first, third, fourth and fifth chambers and to vent said second chamber, and in a fourth position of said rod to supply fluid under pressure to said second, third and fourth chambers and to vent said first and fifth chambers, a spring acting on said rod urging it to said first position, a control piston connected to said rod operable upon supply of fluid under pressure to a chamber to move said rod from said first position to said second position, to said third position and to said fourth position, precompressed spring means in said casing arranged to become successively effective in said second and third positions to define such positions and to oppose movement of said rod by pressure of fluid on said control piston, and stop means engageable by said rod in said fourth position to define same.

ARTHUR J. BENT.

REFERENCES CITED

The following references are of record in the file of this patent:

UNITED STATES PATENTS

| Number | Name | Date |
|---|---|---|
| 715,291 | Potter | Dec. 9, 1902 |
| 2,379,306 | Larson | June 26, 1945 |
| 2,393,503 | Bosomworth | Jan. 22, 1946 |

FOREIGN PATENTS

| Number | Country | Date |
|---|---|---|
| 3,783 | Great Britain | 1914 |